SIGNAL TRANSMISSION COUPLING DEVICE

Filed Oct. 24, 1962 3 Sheets-Sheet 1

WALTER J. CHENEY
INVENTOR.

BY Robert G. Clay

ATTORNEY

WALTER J. CHENEY
INVENTOR.
BY Robert H. Clay
ATTORNEY

WALTER J. CHENEY
INVENTOR.

BY Robert S. Clay

ATTORNEY

United States Patent Office 3,179,909 Patented Apr. 20, 1965

3,179,909
SIGNAL TRANSMISSION COUPLING DEVICE
Walter J. Cheney, San Mateo, Calif., assignor to Ampex Corporation, Redwood City, Calif., a corporation of California
Filed Oct. 24, 1962, Ser. No. 232,850
10 Claims. (Cl. 336—120)

This invention relates to devices in which a signal is transmitted between elements rotating with respect to one another but out of physical contact.

The transmission of signals between a rotating element and a fixed element has always been a problem. In television or wide band magnetic tape recording and reproducing machines, it has previously been customary to feed the electrical signals to and from the rotating transducing heads by means of slip-ring or mechanical commutator devices. However, electrical noise caused by imperfections in the mechanical engagement of such devices distorts the transmitted signal. For example, when such a machine is used for recording or playing back radar echos, a spike of noise may have the same appearance as a target spike, which of course is undesirable.

In some wide band magnetic tape machines the coupling has been made through spaced transformer halves, one fixed and one rotating. It has been found that axial spacing of the transformer halves is preferable to radial spacing, because in the manufacturing process for axially spaced halves the critical parameters, i.e., flatness of the opposing transformer faces and their perpendicularity with respect to the rotational axis, are capable of more precise attainment than are the critical parameters for radially spaced halves, i.e., rotational concentricity and roundness. Variations in these parameters cause variation in the transformer gap during operation and can spoil the signal transmission. However in previous examples of devices with axially spaced transformer halves, all of the heads have been connected in parallel so that there is only one circuit to be coupled, and one transformer. When it is desired to couple each head separately to a non-rotating circuit, then a separate transformer coupling must be used for each head, and great difficulties are encountered in making certain that the gap of each transformer is of precisely the same width as the gap of every other transformer, so that the transmission characteristics will be uniform.

It is therefore an object of this invention to provide a multiple coupling for transmission of two or more signals between differentially rotating members.

It is another object of this invention to provide a rotating transformer coupling in which two or more signal transmission paths are provided across a corresponding number of gaps, all of the gaps being of precisely the same width.

It is a further object of the invention to provide a coupling as above described in which the gap widths are constant through a wide range of temperatures.

A coupling constructed in accordance with the invention employs a number of rotating transformer halves formed as rings mounted in axially spaced relation on a central shaft, and presenting faces all in the same axial direction. A corresponding number of fixed transformer halves, also formed as rings, are mounted in interposed relation with the rotating rings and present faces confronting the rotating faces. Spacing rings or flanges are mounted between the members of both sets of rings. Each rotating ring and the spacer backing it has precisely the same axial dimension as the fixed ring behind it together with the spacer backing this fixed ring, this dimension being established by lapping the parts as a unit.

Thus when mounted, the faces of any two adjacent rotating rings are precisely the same distance apart as the faces of the corresponding fixed rings, and the two axial gaps are always precisely equal.

Further objects and advantages together with a better understanding of the invention may be had by reference to the following description, taken in conjunction with the accompanying drawings, in which.

Figures 1, 4:
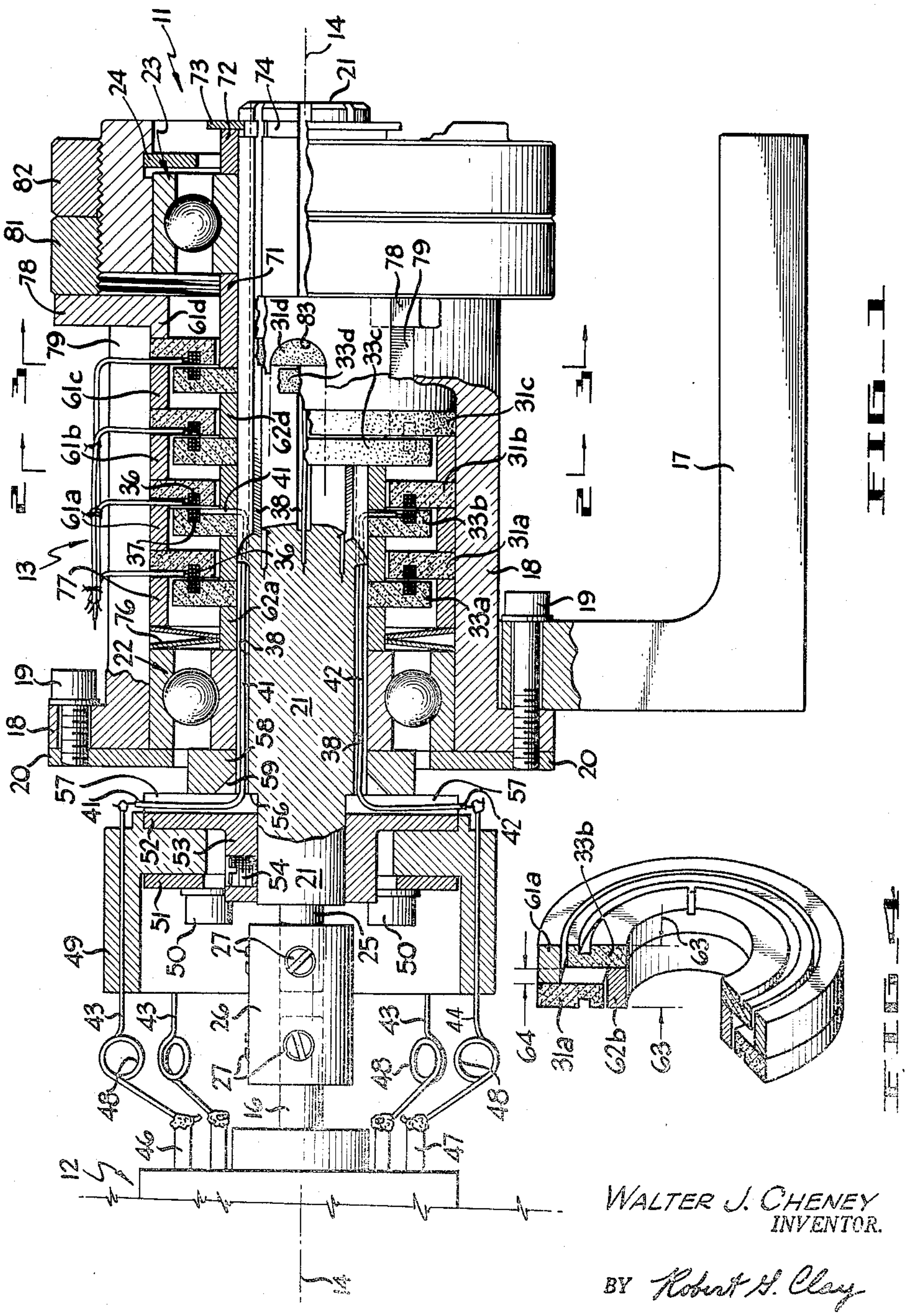
FIGURE 1 is an elevation, partly in section, of a coupling according to the invention.
FIGURE 4 is a sectioned perspective showing a portion of the apparatus of FIGURE 1.

Referring now to the drawings and in particular to FIGURE 1, there is shown a coupling device 11 for the transmission of a number of signals between a rotating member indicated by arrow 12 and a stationary circuit including a number of electrical leads 13.

By way of example the rotating member 12 is a portion of the rotating head drum of a television magnetic tape recorder mounting four transducing heads (not shown) and journaled for rotation about an axis 14 by means standard in the art and also not here shown. For driving the coupling device 11, a rotating shaft 16 extends from the member 12.

The coupling device itself is provided with a framework and mounting means including a fixed base 17, a generally cylindrical housing 18 secured thereto as by bolts 19, which also mount a cover plate 20, and an interior shaft 21 journaled for rotation about the axis 14 as by means of ball bearings 22 and 23 mounted on the interior of housing 18. Ball bearing 23 is secured by means of a spring washer 24 engaging a conforming groove in the housing 18. The shaft 21 has an extension 25 by which it is coupled to extension shaft 16 through a flexible coupling member 26, which is retained by set screws 27. The purpose of the flexible member 26 is to permit slight axial misalignment of shafts 16 and 21 without damage to their separate journal bearings.

Figure 5:
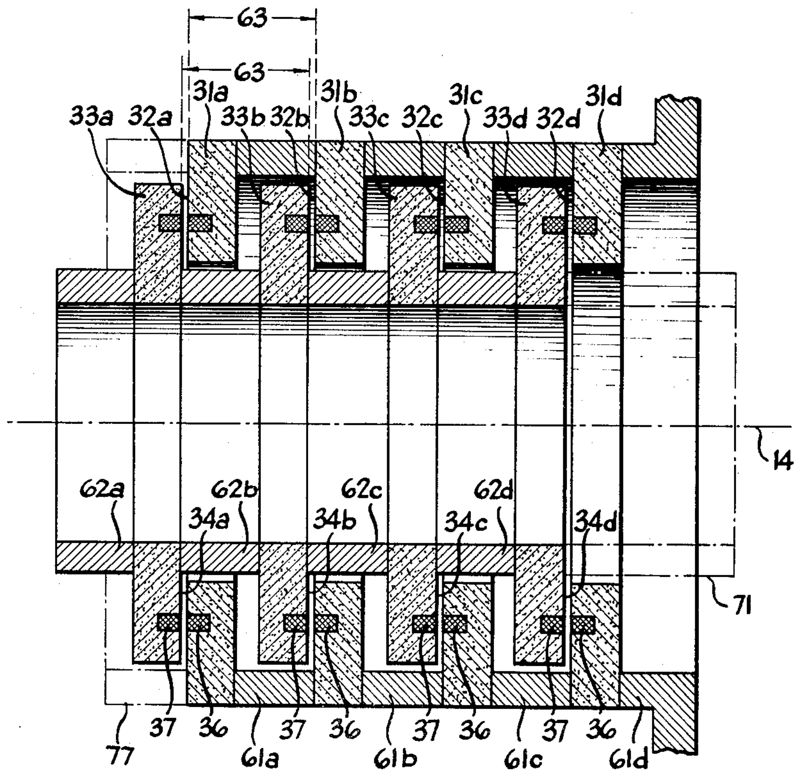
FIGURE 5 is an enlarged section showing a portion of the apparatus of FIGURE 1.

The above described elements constitute the main mechanical framework upon which are mounted other elements for transmitting electrical signals between the rotating heads of number 12 and the stationary circuits coupled to leads 13. It will be seen that as the member 12 rotates, the shaft 21 is caused to rotate with respect to the housing 18. Within the housing 18 and spaced along the axis 14 are mounted four signal transmitting-receiving elements, here shown as transformer halves 31*a*, 31*b*, 31*c* and 31*d* (best shown in FIGURE 5). Each transformer half has a first face 32*a*, 32*b*, 32*c* and 32*d* facing in the same axial direction, i.e. to the left as shown in the figure. These transformer halves, of course, do not rotate and are provided to receive the signal from the rotating elements when the magnetic heads are reading a tape and to transmit the signal from the stationary circuits when the magnetic heads are recording a tape. To complete the electric coupling between the stationary and rotating elements, there are further provided four rotating signal transmitting-receiving elements, here shown as transformer halves 33*a*, 33*b*, 33*c* and 33*d* mounted on the rotating shaft 21 and spaced along the axis 14. Each rotating transformer half has a second face 34*a*, 34*b*, 34*c* and 34*d* confronting the corresponding one of first faces 32*a*–32*d*, and spaced therefrom to define a very small physical gap across which the signal is transmitted as by electromagnetic induction. To produce this transmission, each transformer half is formed of a suitable core material, such as ferrite, and has a toridal electrical coil inlaid as in a corresponding groove in the confronting face. For example, each half 31 has a coil 36 mounted in a conforming groove in its face 32 and coupled to the stationary circuits as by means of leads 13; and each transformer half 33 has a coil 37 mounted in a conforming recess in its face 34 and directly confronting the corresponding coil 36. Each coil 37 is connected to a different one of the rotating heads as by means of leads running down spline grooves 38 of shaft 21 (see FIGURE 1). For example coil 37 of transformer half 33*b* has two leads 41 and 42 running down a pair of diametrically opposite spline grooves 38 and electrically coupled to a pair of flexible leads 43 and 44, which in turn are electrically coupled to terminals 46, 47. The terminals 46 and 47 are coupled in a standard manner to a single one of the rotating heads. Each of the leads 43, 44 is formed of flexible metal and has a portion 48 formed in at least one helical turn to provide flexibility in the electrical coupling corresponding to that of the flexible mechanical coupling 26.

Each lead 43, 44 is mounted in an insulating block 49 which in turn is mounted by means of bolts 50 and a bearing plate 51 to a flange 52 of a mounting member 53. The mounting member 53 is secured to the shaft 21 by means of set screws 54 and is arranged to bear against a shoulder 56 formed on the shaft 21. In order to avoid cutting or putting pressure on the insulation of leads 41, 42 each of these leads is conducted through a radial groove 57 formed in the flange 52, and the ball bearing 22 is spaced from the flange by means of a ring shaped spacing member 58, the inner surface of which presents a bevelled portion 59 toward the leads 41, 42.

An important feature of the invention is the arrangement by which it is ensured that all of the gaps existing between the respective pairs of confronting first and second faces 32 and 34 are maintained at precisely the same dimension. The arrangement is such that the actual gap width is variable and may be changed at will, but at any one instant all of the gaps are exactly the same dimension; i.e. the gap between faces 32*a* and 34*a* is always precisely the same width as the gap between the faces 32*b* and 34*b*, the gap between faces 32*c* and 34*c*, and the gap between 32*d* and 34*d*. Thus the transmission characteristics of transformer 31*a*, 33*a* are always the same as the transmission characteristics of transformer 31*b*, 33*b*, and so on. This condition is brought about by making certain that the axial dimension between each adjacent pair of first faces 32 is precisely the same as the axial dimension between the corresponding pair of adjacent second faces 34. For example, in the illustrated structure (see FIGURE 5), the axial dimension between first faces 32*a* and 32*b* is precisely the same as the axial dimension between the corresponding second faces 34*a* and 34*b*. This axial dimension may without harm be considerably different from the axial dimension existing between faces 32*b*, 32*c* and faces 34*b*, 34*c*, but in the latter group, the dimension 32*b*, 32*c* is nevertheless precisely the same as the dimension 34*b*, 34*c*. So long as this principle is followed and the conditions prescribed are met, then it is unavoidable that the gap of transformer 31*a*, 33*a* will be precisely the same as the gap of transformer 31*b*, 33*b* and so on.

To produce this critical dimension relationship each transformer half is separated from the adjacent one by means of a ring-shaped spacer, here shown as spacers 61*a*, 61*b*, 61*c* and 61*d* for the outer or stationary transformer halves 31 and spacers 62*a*, 62*b*, 62*c*, and 62*d* for the inner or rotating transformer halves 33. In practice, each of the spacers is made of electromagnetically insulating material, such as aluminum, and is bonded to one of the adjacent ferrite pieces so as to project therefrom in the manner of an axially directed flange. For example as shown in FIGURE 4, the ferrite transformer half 31*a* is bonded to the spacer 61*a*, and the ferrite transformer half 33*b* is bonded to the spacer 62*b*. During the process of manufacture, and after the initial bonding is effected, the two corresponding assemblies are nested as illustrated in FIGURE 4 and are lapped together between two parallel lap plates so that the overall axial dimension (indicated by arrows 63) of the assembly 62*b*, 33*b* is precisely the same as the overall axial dimension of the assembly 31*a*, 61*a*. It is the lapping of these corresponding assemblies together, and in the same manufacturing step, that provides the dimensional characteristics set forth above. Comparing FIGURE 4 and FIGURE 5, it will be seen that the overall axial dimension of elements 62*b*, 33*b* is exactly the same as the over-all axial dimension of elements 31*a*, 61*a* and it follows that the distance between faces 32*a* and 32*b* is exactly the same as the distance between faces 34*a* and 34*b*. When this condition obtains, the gap of transformer 31*a*, 33*a* is of exactly the same width as the gap of transformer 31*b*, 33*b*. To avoid confusion, it should be noted that the ferrite parts and their fused spacing flanges that are lapped together during the manufacturing process always form parts of different transformers; e.g. (FIGURE 4) part 31*a* comes from a different transformer than part 33*b*. In this connection it is observed that the spacing elements are of sufficient dimension to leave a considerable space, indicated by the arrow 64, between the back faces of adjacent transformer halves, e.g. members 31*a* and 33*b*. This space provides a certain amount of free play for adjusting the desired gap between the two halves of any particular transformer as will be described below, and is also desirable for the purpose of avoiding electromagnetic coupling between such back to back transformer halves, which as noted above are parts of different transformers.

Figure 2:
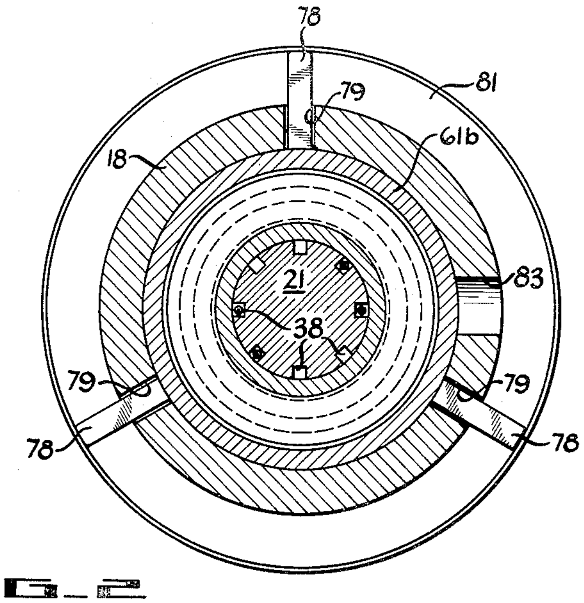
FIGURE 2 is a cross-section taken on the plane of lines 2—2 of FIGURE 1.
Figure 3:
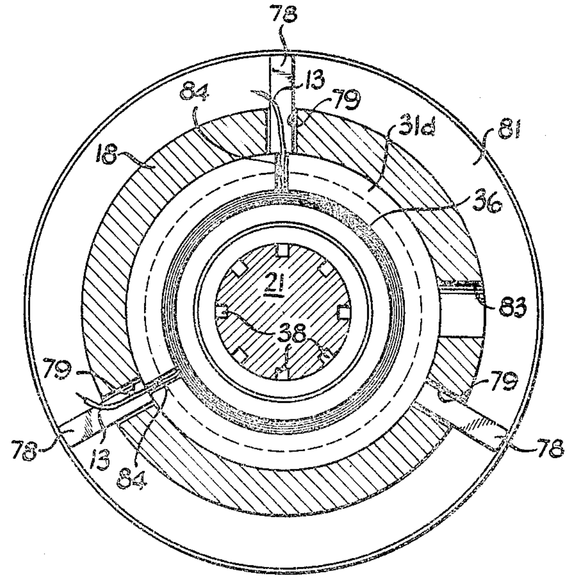
FIGURE 3 is a cross-section taken on the plane of lines 3—3 of FIGURE 1.

In assembling the apparatus, it is desirable to obtain the minimum physical gap between corresponding transformer halves that it is possible to obtain without actual physical contact between the halves. For this reason, it is arranged that all of the outer or nonrotating transformer halves 31 be movable as a group in an axial direction with respect to the inner or rotating transformer halves 33. As is shown in FIGURE 1, the rotating transformer halves 33 together with their spacing flanges 62 are mounted solidly against one another and against the inner race of ball bearing 22 and are compressed to the left as shown in the figure by means of a spacer 71, the inner race of ball bearing 23, a spacer ring 72, and a spring washer 73 engaging a peripheral groove 74 in the end of shaft 21. The inner rotating transformer halves are consequently relatively immovable in an axial direction. The outer or nonrotating transformer halves 31 and their spacers 61 are however mounted for relative axial movement within the housing 18 as by means of a dished disc spring 76 engaging the outer race of ball bearing 22, and a spacing ring 77 at one end of the assembly and an adjusting mechanism at the other or right hand end of the assembly as seen in the figure. Particularly, as shown in FIGURES 1–3, the spacing ring 61*d* is formed with three equally spaced radial arms 78 projecting outwardly through three corresponding longitudinal slots 79 that are formed in the housing 18. These arms 78 are engaged by a nut 81 that is threaded on the end of housing 18. Rotation of the nut 81, in a direction to cause it to travel to the left as shown in the drawing, moves the entire assembly of nonrotating transformer halves 31 to the left against the resistance of spring 76 until these transformer halves are stopped as by actual physical engagement with the corresponding rotating transformer halves 33. The nut 81 may then be backed off a desired fraction of a turn to provide the precise gap spacing desired, during which process the nonrotating transformer halves 31 are moved slightly to the right as shown in the drawing by the urging of spring 76. A lock nut 82 is also threaded on the end of housing 18 to lock the nut 81 in position once the desired setting has been made. As an additional aid to the gap setting process, an axially elongated slot 83 is formed in the housing 18 so that the gaps may actually be seen by the eye and measured by means of gauges.

Referring now to FIGURE 3, there is shown how the leads 13 of coil 36 of transformer half 31*d* are conducted through radial grooves 84 in member 31*d* and through a pair of the slots 79 to the exterior of the housing 18 for coupling to the external stationary circuit for the particular rotating head that is coupled to the rotating transformer half 33*d*.

As a further feature of the invention, the apparatus is constructed in such a way that variations in the environmental temperature do not alter the gap spacing that is set for the array of transformers. The axial dimensions of each transformer half and its associated spacers are elected so that when the temperature coefficients of expansion of the materials are taken into account, each transformer and spacer assembly expands or contracts the same total dimension as does the member on which the assembly is mounted. For example, the mounting shaft 21 is formed of stainless steel, partly for electromagnetic insulation between the transformer halves mounted thereon, the spacing rings 62 are formed of aluminum, and the transformer halves 33 are formed of ferrite. The axial length of spacer 62*a* multiplied by its coefficient of expansion plus the axial length of transformer half 33*a* multiplied by its coefficient of expansion equals the overall axial length of the two members multiplied by the coefficient expansion of the material (stainless steel) of which the shaft 21 is made. The same relationship is obtained for the outer nonrotating ferrite transformer halves 31, their corresponding aluminum spacers 61, and the housing 18, which is also made of stainless steel.

In the manufacture and assembly of the apparatus, spacing rings 71 and 77 may be of any convenient axial dimension, as may also be the assemblies of members 33*a*, 62*a*, and 31*d*, 61*d* respectively. However the assemblies 31*a*, 61*a* and 33*b*, 62*b* must be of a precisely the same axial dimension and are lapped together as shown in FIGURE 4 to achieve this end. Likewise the assemblies of 31*b*, 61*b* and 33*c*, 62*c* are precisely the same axial dimension and are lapped together, as are in turn the assembly of 31*c*, 61*c* and 33*d*, 62*d* respectively. The assembly 31*a*, 61*a*, 33*b*, and 62*b* need not be of the same axial dimensions the assembly 31*b*, 61*b*, 33*c*, 62*c*, or the assembly 31*c*, 61*c*, 33*d*, 62*d*, but these dimensions are usefully made at least approximately the same for ease of interchangeability of the assemblies, and also to make it easier to establish the dimensional condition described above for temperature and expansion compensation of the apparatus.

In operation, after the assembly of the transformer halves and of the complete apparatus, the gap distances are established by rotating the nut 81 so as to move it to the left as shown in FIGURE 1 until the outer transformer halves 31 are stopped by engagement with the inner transformer halves 33. The nut 81 is then backed off to a desired fraction of a rotation to establish the gap desired, and the spring 76 moves the outer transformer halves 31 to establish this gap. The rotating head assembly 12 is then set in operation, and each of the four rotating heads, coupled separately through a different one of the transformers, transmits or receives desired signals as by electromechanical coupling across the respective transformer gaps.

It will be seen that in the configuration above described there is no variation of the dimension of any one gap during the rotation of the rotating parts with respect to the stationary parts. The process of lapping the flat faces 32 and 34 of the respective transformer halves produces an extremely uniform flat surface perpendicular to the axis of the transformer halves and without being subject to the defects of eccentricity of mounting or out of roundness such as obtain between transformer halves known in the art that are spaced radially from one another instead of axially. At the same time with the configuration above described, more than one coupling can be independently maintained for circuits and signals that are desired to be kept separate, and the gap that exists between the halves of one transformer is always exactly the same as the gap that exists between the halves of any other transformer, so that the electromagnetic transmission effect is precisely the same in all of the transformers.

While the invention has been illustrated and described as including four transformers, each coupling a separate head to a utilization circuit, it will be understood that the invention is useable with any plural number of transformers and heads. As a variation, a given number of transformers may be used to couple twice that number of heads, with two heads coupled in parallel through each transformer. In such cases the two associated heads would ordinarily be mounted diametrically opposite one another on the head drum.

It should also be noted that the basic structure of the invention may be used advantageously not only with transformer coupling devices, but also with capacitative, or photo-electric, or any other type of coupling in which signals are transmitted without physical contact between the rotating and stationary coupling elements.

Thus, there has been described a coupling constructed in accordance with the invention, including a number of rotating transformer halves formed as rings mounted in axially spaced relation on a central shaft, and presenting faces all in the same axial direction. A corresponding number of fixed transformer halves, also formed as rings, are mounted in interposed relation with the rotating rings and present faces confronting the rotating faces. Spacing rings or flanges are mounted between the members of both sets of rings. Each rotating ring and the spacer backing it has precisely the same axial dimension as the fixed ring behind it together with the spacer backing this fixed ring, this dimension being established by lapping the parts as a unit. Thus when mounted, the faces of any two adjacent rotating rings are precisely the same distance apart as the faces of the corresponding fixed rings, and the two axial gaps are always precisely equal.

What is claimed is:

1. In a device of the class wherein a plurality of predetermined signals are coupled between spaced-apart and relatively rotating signal coupling elements, the combination comprising:

a first plurality of said elements mounted along an axis and each including a ring-shaped signal-coupling portion presenting a first face facing in one axial direction and a spacing portion extending axially from the outer periphery of said signal-coupling portion and engaging the adjacent one of said first elements;

a second plurality of said elements mounted along said axis and each including a circular signal-coupling portion fitting loosely within the spacing portion of one of said first elements and presenting a second face confronting one of said first faces, each second element also including a spacing portion extending loosely through the central opening of said one first element and engaging the adjacent second element;

each of said first elements having a portion formed of material that is insulating with respect to said signals such that the one of said signals that is passed by each first element is isolated from the adjacent first elements;

each of said second elements having a portion formed of material that is insulating with respect to said signals such that the one of said signals that is passed by each second element is isolated from the adjacent second elements; and the axial spacing between each adjacent pair of first faces being precisely the same as the axial spacing between the corresponding pair of second faces, and one pair of confronting first and second faces having a predetermined axial spacing, whereby the axial spacing between every pair of confronting first and second faces is precisely the same.

2. In a device of the class wherein a plurality of predetermined signals are coupled between spaced-apart and relatively rotating signal coupling elements, the combination comprising:

a first plurality of said signal coupling elements formed as circular rings and mounted in spaced relation along a central axis, each of said rings presenting a first face facing in a predetermined axial direction;
a first number of ring-shaped spacing members formed of material that is insulating with respect to said signal and interpositioned between the outer peripheral portions of said rings;
a second plurality of said signal coupling elements formed as circular rings centered upon and mounted in spaced relation along said axis between said first rings and within said first spacing members and for rotation about said axis with respect to said first rings, each ring of said second plurality presenting a second face confronting one of said first faces;
a second number of ring-shaped spacing members formed of said insulating material and interpositioned between the inner peripheral portions of said second rings;
the axial spacing between each adjacent pair of first faces being precisely the same as the axial spacing between the corresponding pair of second faces; and
means for moving said first and second pluralities of elements and spacing members axially with respect to one another for varying the spacing between each pair of confronting first and second faces.

3. In a device of the class wherein a plurality of predetermined signals are coupled between spaced-apart and relatively rotating signal coupling elements, the combination comprising:

a first plurality of said elements formed as circular rings and mounted in spaced relation along a central axis, each of said rings presenting a first face facing in a predetermined axial direction;
a first number of ring-shaped spacing members formed of material that is insulating with respect to said signal and interpositioned between the outer peripheral portions of said rings;
a second plurality of said elements formed as circular rings centered upon and mounted in spaced relation along said axis between said first rings and within said first spacing members and for rotation about said axis with respect to said first rings, each ring of said second plurality presenting a second face confronting one of said first faces;
a second number of ring-shaped spacing members formed of said insulating material and interpositioned between the inner peripheral portions of said second rings;
the axial spacing between each adjacent pair of first faces being precisely the same as the axial spacing between the corresponding pair of second faces;
an outer cylindrical housing coaxially and slidably engaging the outer peripheries of said first elements and members;
a central shaft journalled for rotation within said housing and coaxially mounting said second members and elements;
means for moving said first elements and spacing members axially with respect to said second elements and spacing members for varying the spacing between each pair of confronting first and second faces.

4. In a device of the class wherein a plurality of predetermined signals are coupled between spaced-apart and relatively rotating signal coupling elements, the combination comprising:

a first plurality of said elements formed as circular rings ffiand mounted in spaced relation along a central axis, each of said rings presenting a first face facing in a predetermined axial direction;
a first number of ring-shaped spacing members formed of material that is insulating with respect to said signal and interpositioned between the outer peripheral portions of said rings;
a second plurality of said elements formed as circular rings centered upon and mounted in spaced relation along said axis between said first rings and within said first spacing members and for rotation about said axis with respect to said first rings, each ring of said second plurality presenting a second face confronting one of said first faces;
a second number of ring-shaped spacing members formed of said insulating material and interpositioned between the inner peripheral portions of said second rings;
the axial spacing between each adjacent pair of first faces being precisely the same as the axial spacing between the corresponding pair of second faces;
an outer cylinder housing coaxially and slidably engaging the outer peripheries of said first elements and members;
a central shaft journalled for rotation within said housing and coaxially mounting said second elements and members;
spring means engaging said housing and one end of said first plurality of elements and members for urging said first plurality in one axial direction with respect to said housing, shaft and second plurality; and
means threaded coaxially on said housing and engaging the other end of said first plurality of elements and members for moving and permitting movement of said first plurality respectively against and in said one axial direction respectively against and under the urging of said spring means.

5. In a device of the class wherein a plurality of predetermined signals are coupled between spaced-apart and relatively rotating signal coupling elements, the combination comprising:

a first plurality of said elements formed as first circular rings and mounted along a central axis, each of said rings having an outer peripheral flange formed of material that is insulating with respect to said signal, said flange extending in a predetermined axial direction, and each of said rings having a first face facing in a direction opposite to said first predetermined direction, the flange portion of one ring engaging the first face of the next ring for spacing said first faces along said axis;
a second plurality of said elements formed as second circular rings centered upon and mounted for rotation with respect to said first rings about said axis, each but one of said second rings being interpositoned between a pair of said respective first rings and within the inner periphery of the flange of a corresponding one of said pair, each ring of said second plurality presenting a second face confronting one of said first faces and an inner peripheral flange formed of said insulating material and extending opposite to said predetermined direction and through the central opening of said corresponding first ring to engage the second face of the next adjacent second ring;
the axial dimension of each first ring including the flange thereof being precisely the same as the axial dimension of the corresponding second ring including the flange thereof;
whereby the axial spacing between each pair of confronting first and second faces is precisely the same as the axial spacing between every other such pair.

6. In a device of the class wherein a plurality of predetermined signals are coupled between spaced-apart and relatively rotating signal coupling elements, the combination comprising:

a first plurality of said elements formed as first circular rings and mounted along a central axis, each of said rings having an outer peripheral flange formed of material that is insulating with respect to said signal, said flange extending in a predetermined axial direction, and each of said rings having a first face facing in a direction opposite to said predetermined direction, the flange portion of one ring engaging the first face of the next ring for spacing said first face along said axis;

a second plurality of said elements formed as second circular rings centered upon and mounted for rotation with respect to said first rings about said axis, each but one of said second rings being interpositioned between a pair of said respective first rings and within the inner periphery of the flange of a corresponding one of said pair, each ring of said second plurality presenting a second face confronting one of said first faces and an inner peripheral flange formed of said insulating material and extending opposite to said predetermined direction and through the central opening of said corresponding first ring to engage the second face of the next adjacent second ring;

the axial dimension of each first ring including the flange thereof being precisely the same as the axial dimension of the corresponding second ring including the flange thereof; and means for moving said first and second pluralities of elements axially with respect to one another for varying the spacing between each pair of confronting first and second faces.

7. In a device of the class wherein a plurality of predetermined signals are coupled between spaced-apart and relatively rotating signal coupling elements, the combination comprising:

a first plurality of said elements formed as first circular rings and mounted along a central axis, each of said rings having an outer peripheral flange formed of material that is insulating with respect to said signal, said flange extending in a predetermined axial direction, and each of said rings having a first face facing in a direction opposite to said predetermined direction, the flange portion of one ring engaging the first face of the next ring for spacing said first faces along said axis;

a second plurality of said elements formed as second circular rings centered upon and mounted for rotation with respect to said first rings about said axis, each but one of said second rings being interpositioned between a pair of said respective first rings and within the inner periphery of the flange of a corresponding one of said pair, each ring of said second plurality presenting a second face confronting one of said first faces and an inner peripheral flange formed of said insulating material and extending opposite to said predetermined direction and through the central opening of said corresponding first ring to engage the second face of the next adjacent second ring;

the axial dimension of each first ring including the flange thereof being precisely the same as the axial dimension of the corresponding second ring including the flange thereof;

an outer cylindrical housing coaxially and slidably engaging the outer peripheries of said first rings;

a central shaft journalled for rotation within said housing and coaxially mounting said second rings;

spring means engaging said housing and one end of said first plurality of first rings for urging said first rings in one axial direction with respect to said housing, shaft and second rings; and means threaded coaxially on said housing engaging the other end of said first plurality of first rings for moving and permitting movement of said first rings respectively against and in said one axial direction respectively against and under the urging of said spring means.

8. In a device of the class wherein a plurality of predetermined signals are coupled between spaced-apart and relatively rotating signal coupling elements, the combination comprising:

a first plurality of said elements formed as first circular rings and mounted along a central axis, each of said rings having an outer peripheral flange formed of material that is insulating with respect to said signal, said flange extending in a predetermined axial direction, and each of said rings having a first face facing in a direction opposite to said predetermined direction, the flange portion of one ring engaging the first face of the next ring for spacing said first faces along said axis;

a second plurality of said elements formed as second circular rings centered upon and mounted for rotation with respect to said first rings about said axis, each but one of said second rings being interpositioned between a pair of said respective first rings and within the inner periphery of the flange of a corresponding one of said pair, each ring of said second plurality presenting a second face confronting one of said first faces and an inner peripheral flange formed of said insulating material and extending opposite to said predetermined direction and through the central opening of said corresponding first ring to engage the second face of the next adjacent second ring;

the axial dimension of each first ring including the flange thereof being precisely the same as the axial dimension of the corresponding second ring including the flange thereof;

an outer cylindrical housing coaxially and slidably engaging the outer peripheries of said first rings;

a central shaft journalled for rotation within said housing and coaxially mounting said second rings;

spring means engaging said housing and one end of said first plurality of first rings for urging said first rings in one axial direction with respect to said housing, shaft and second rings;

the first ring at the other end of said first plurality being formed with spider arms extending radially outwardly through suitable longitudinal slots in said housing; and means threaded coaxially on said housing and engaging said spider arms for moving and permitting movement of said first rings respectively against and in said one axial direction respectively against and under the urging of said spring means.

9. The combination characterized in claim 8 wherein:

said first and second rings are formed of materials having a composite thermal expansion rate in an axial direciton equal to the expansion rate of the material forming said housing and shaft;

whereby the spacing established between said first and second faces is preserved despite environmental temperature changes.

10. In a device of the class wherein a plurality of predetermined signals are coupled between spaced-apart and relatively rotating signal coupling elements, the combination comprising:

a first plurality of transformer halves formed as first circular rings and mounted along a central axis, each of said rings having an outer peripheral flange extending in a predetermined axial direction, and a first face facing in a direction opposite to said predetermined direction, the flange portion of one ring engaging the first face of the next ring for spacing said first faces along said axis;

a second plurality of transformer halves formed as second circular rings centered upon and mounted for rotation with respect to said first rings about said axis, each but one of said second rings being interpositioned between a pair of said respective first rings and within the inner periphery of the flange of a corresponding one of said pair, each ring of said second plurality presenting a second face confronting one of said first faces and an inner peripheral flange extending opposite to said predetermined direction and through the central opening of said corresponding first ring to engage the second face of the next adjacent second ring;

the axial dimension of each first ring including the flange thereof being precisely the same as the axial dimension of the corresponding second ring including the flange thereof;

an outer cylindrical housing coaxially and slidably engaging the outer peripheries of said first rings;

a central shaft journalled for rotation within said housing and coaxially mounting said second rings;

spring means engaging said housing and one end of said first plurality of first rings for urging said first rings in one axial direction with respect to said housing, shaft and second rings;

the first ring at the other end of said first plurality being formed with spider arms extending radially outwardly through suitable longitudinal slots in said housing;

means threaded coaxially on said housing and engaging said spider arms for moving and permitting movement of said first rings respectively against and in said one axial direction respectively against and under the urging of said spring means; and each of said rings comprising a body portion of suitable core material presenting said face thereof and a toroidal electric coil mounted in a conforming circular recess opening on said face and centered on said axis, the coil in each face being of the same diameter as the coil in the confronting face, and the flange portion of each ring being formed of electromagnetically insulating material.

References Cited by the Examiner

UNITED STATES PATENTS

| | | | |
|---|---|---|---|
| 2,567,394 | 9/51 | Nuttman | 336—83 |
| 2,823,359 | 2/58 | Wentworth | 336—135 X |
| 2,894,231 | 7/59 | Krasno | 336—83 |
| 2,935,707 | 5/60 | Abbott | 336—135 |

JOHN F. BURNS, *Primary Examiner.*